Sept. 16, 1930.  R. F. WEDGE  1,775,837
PACKAGE FOR PLANTS
Filed Jan. 12, 1927
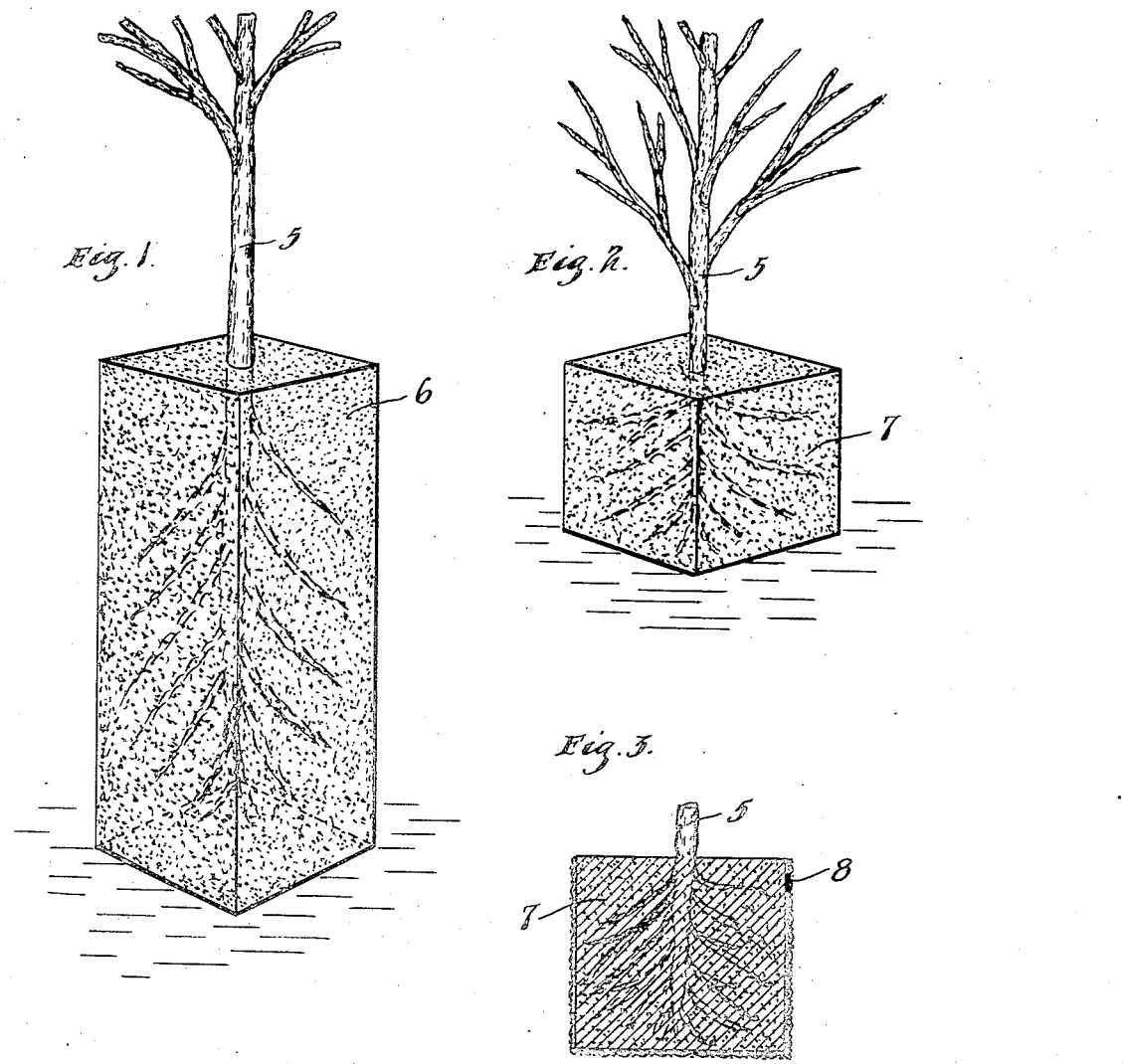
INVENTOR.
RALPH F. WEDGE.
BY HIS ATTORNEYS.

Patented Sept. 16, 1930

1,775,837

UNITED STATES PATENT OFFICE

RALPH F. WEDGE, OF ALBERT LEA, MINNESOTA

PACKAGE FOR PLANTS

Application filed January 12, 1927. Serial No. 160,719.

This invention relates to a package and particularly to a package comprising a plant which is to be transplanted. As is well known, plants such as young trees are lifted from the ground at the nurseries and transported to various places for sale and replanting. It is the most common method to handle and transport the plants with the roots substantially free from dirt. It is also the common practice to nurserymen to transplant the young trees from the propagating beds to other locations at least three times before the trees are ready for sale. This is particularly true of evergreen trees. This transplanting is necessary in order that the roots may be kept or confined within a reasonably small space, as otherwise the roots would spread over such a wide area that it would be impossible to lift the plant and successfully replace the same. Each time a plant is thus transplanted, its growth is retarded, the plant more or less stunted, and its perfect development interfered with. It is very desirable, therefore, to have the plant in some medium or package where the transplanting would be unnecessary or the retarding of growth eliminated, and in which the plant could still remain when it is to be transported for replanting.

It is an object of this invention, therefore, to provide a plant package in which the plant can conveniently be disposed and in which its growth may continue.

It is another object of the invention to provide a plant package in which the plant may remain from the time it is taken from the propagating bed until it is ready for replanting in its permanent location.

It is still another object of the invention to provide a plant package comprising peat.

It is also an object of the invention to provide a plant package comprising a body of peat which has been formed and compressed about the roots of the plant.

These and other objects and advantages of the invention will be fully set forth in the following description made in connection with the accompanying drawings, in which like reference characters refer to similar parts throughout the several views and in which:—

Fig. 1 is a view of one form of plant package;

Fig. 2 is a view of a slightly different form of the plant package; and

Fig. 3 is a view in vertical section through a plant package such as shown in Fig. 2, also showing the same encased in a covering.

Referring to the drawings, in Fig. 1 a plant 5 such as a young tree is shown, the lower portion and the roots of which are encased in a body 6. In the package of this invention peat is used for the body 6 and while possibly other equivalent substances might be used, such as some grades of lignite, yet in practice peat has been found to be the satisfactory material. The plant is placed in a suitable mold or container and the peat placed about the roots thereof in a fresh and fairly loose condition. The peat is then compressed to a considerable extent by suitable apparatus about the plant and roots thereof, the roots being wholly or partially free from earth so that a very close and intimate contact and engagement is had between the peat and the roots of the plant. Not only is the peat brought directly into contact with and into very close engagement with the roots of the plant, particularly the small fibrous roots, but the peat is so compressed that it is given a definite and substantially permanent shape so that it adheres firmly to the plant and coheres together forming a tough material. The package is thus given a definite shape or form which it maintains and while this form may vary as desired, in the embodiment of the invention illustrated the forms are shown as rectangular or in the shape of parallelopipeds.

In Fig. 2 a plant package 7 similar to that in Fig. 1 is shown, except that the peat formed about the base of the plant is substantially in the shape of a cube.

In some cases where the package is to be shipped, a fabric covering 8 is placed thereover as shown in Fig. 3.

When the peat is compressed about the plant when it is quite small, the plant may continue its growth just as though it were placed in the ground. Peat has considerable moisture therein and a great deal of this moisture, particularly in the interior of the body of the peat, will be retained. Peat also forms an excellent plant food and contains a great deal of nutritious matter for the plants. The plant in the body of the peat can therefore continue its growth, and as the plant becomes larger, it is only necessary to enlarge the body of the peat about the base thereof by compressing more peat on the package. The roots of the plant are thus not disturbed but merely may grow out into the additional peat material. The plant thus continues its growth without the same being halted by having the small fibrous roots torn from the material in which they are growing. When this is done, a certain amount of time elapses before the roots can again become set in the soil or other medium and again function properly. The plant can thus develop naturally and assume a perfect shape.

The peat block when compressed about the base and roots of the plant form a package as above stated, which is admirably adapted for transportation of the plant. When the plants are placed in the package in the early spring, they can begin to grow and are not retarded as they are when lifted and shipped with the roots practically bare. The package is thus very suitable for store merchandising, as the plants are maintained in good shape and keep a live and pleasing appearance. The customer can also see that the plant is really alive and is growing, which is not always the case when the roots are bare and dry.

When the peat is placed about the plant, the roots thereof are protected from temperature changes which might otherwise cause damage to the plant if the roots were bare. Applicant's package, therefore, makes possible the shipment and merchandising of the plants under all ordinary temperature conditions and during greater ranges of temperature than would be possible with the ordinary procedure. The enclosing block of peat also prevents drying of the roots. When plants are lifted and transported with the roots bare, there is a large amount of evaporation from the roots and the roots become quite dry and more or less hard. This results in a greater period being necessary for the plant to again resume its normal growth. This evaporation and drying of the the roots is prevented with applicant's invention.

With deciduous trees, the peat package prolongs the planting season as the plant has considerable growth in the package and thus does not have to start an entirely new growth when planted. With plants in which the roots are dry, as in the ordinary practice, it is unsafe to plant the same after the season is well advanced. When the plant having the peat about the roots and base thereof is planted, however, it is placed in the ground with the peat block still thereabout and it is only necessary for the roots to continue their growth outward into the soil in which the plant is placed. Furthermore, the peat used is quite light, being about 1/14th the weight of clay. The transportation charges of applicant's package is thus a great deal less than if the trees are shipped in clumps with some clay held on the roots by being wrapped in burlap or other fabric. As above stated, the peat is rich in plant food and is thus very nutritious, while ordinary clay is quite negative as to nutrition. Also as above stated, the peat contains a great deal of moisture so that the necessary moisture for the plant roots is also provided.

From the above description it is seen that applicant has provided a very simple and efficient plant package and one that has great advantages in the handling and transplanting of the plants. The material used for the package is easily obtainable and the package is easily and quickly made. The package of the present invention has been amply demonstrated in practice and has been found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A plant package for a plant such as a small tree having a quantity of peat disposed about the lower portion of the stem or trunk and the roots thereof and between and in direct contact with said roots, said peat being compressed into a block of definite and permanent shape which surrounds said roots.

2. A plant package comprising a small tree or similar plant having a quantity of peat compressed to a considerable extent and to a definite shape directly about the roots thereof and the lower portion of the stem or trunk and a covering of sheet material surrounding said peat.

3. The method of forming a plant package for a small tree or similar plant which consists in freeing the roots of earth and then compressing a quantity of raw peat directly about and in contact with the roots and lower portion of the trunk of said plant to cause said peat to cohere in permanent definite shape and to adhere to said roots and trunk thus forming a permanent package of definite shape.

4. A plant package for a small tree or similar plant comprising a quantity of moist plastic peat compressed into definite shape about the base of the stem or trunk and the roots of said plant, said peat thus cohering and being disposed between and in direct contact with the roots so that the roots are embedded in said peat and a permanent package is formed.

In testimony whereof I affix my signature.

RALPH F. WEDGE.